United States Patent [19]

Weigend et al.

[11] Patent Number: 4,712,918

[45] Date of Patent: Dec. 15, 1987

[54] METHOD FOR MEASURING INK DENSITY

[75] Inventors: Helmut Weigend, Leipzig; Bernd Morgenstern, Lützschena; Peter Reinhardt, Leipzig, all of German Democratic Rep.

[73] Assignee: Veb Kombinat Polygraph "Werner Lambertz" Leipzig, Leipzig, German Democratic Rep.

[21] Appl. No.: 671,629

[22] Filed: Nov. 14, 1984

[30] Foreign Application Priority Data

Nov. 14, 1983 [DD] German Democratic Rep. ... 256652

[51] Int. Cl.[4] ............................................ G01N 21/86

[52] U.S. Cl. .................................... 356/429; 356/446

[58] Field of Search ............................... 356/445–448, 356/443–444, 429

[56] References Cited

U.S. PATENT DOCUMENTS 4,003,660 1/1977 Christie et al. ................ 356/448 X

FOREIGN PATENT DOCUMENTS 2023467 11/1971 Fed. Rep. of Germany .

*Primary Examiner*—Vincent P. McGraw

*Attorney, Agent, or Firm*—Michael J. Striker

[57] ABSTRACT

In a method for measuring ink density of printed sheets by means of photodiodes which scan light reflection from measuring marks provided on printed sheets, the start of a dynamic measuring process during the running of the printing machine is released by the control of impulse flanks, and the reflected light is scanned by sensors having a short response time. A medium reflection value of the surface of the measuring mark is determined. The control of impulse flanks takes place by a leading edge of the mark printed on the sheet, and the signal, released by that control, switches on the photodiodes and the light source. A changed voltage occurring at the output of each photodiode is amplified, and its peak value is stored; and the photodiodes and the light source are switched off thereafter.

3 Claims, No Drawings

METHOD FOR MEASURING INK DENSITY

BACKGROUND OF THE INVENTION

The present invention pertains to a method for measuring ink density in a printing machine.

A device for measuring ink density in a running printing machine has been disclosed in DE-OS No. 20 23 467. This device includes a measuring head, a light source for the illumination of measuring marks provided on a sheet being printed, and a photometer which receives reflected light. In the disclosed device the information is obtained by the comparison of the ink density on all printed sheets, and an assumption is made on the basis of that information for controlling an inking.

An essential structural component of the known device is the photometer with a response time in the range of milliseconds. With such response time a minimal length of the measuring mark (in the printing direction) of about 5 mm is realized at the speed of the upper surface of the printed sheet of about 2 m/s.

The measuring value is constituted in the known device by a timely integration. The disadvantage of this known device is the dependence of the precision of measuring on the speed of the printed sheet because, due to a high response time of one millisecond, various large surfaces of the measuring marks are monitored. A further disadvantage of the known device is that a medium precision for satisfactory controlling the inking is insignificant.

SUMMARY OF THE INVENTION

It is an object of the present invention to provide an improved method for measuring ink density on the printed sheets in the printing machine.

It is another object of this invention to provide a method for measuring ink density, which enables the precise control of the inking and thereby improves the quality of the printed products.

It is a further object of the present invention not only to increase the precision of measuring ink density but also to maintain this precision at various speeds of printing.

These and other objects of the invention are attained by a method for measuring ink density on printed sheets in an operating printing machine by means of a measuring head, a light source which illuminates measuring marks provided on a printed material, and a sensor, which receives reflected light from said marks, and measures a value of the reflected light and converts said value with an electrical signal and an electrical circuit receiving said signal, the method comprising the following steps:

(a) releasing a start of a measuring process by controlling electrical impulse flanks of said signals;

(b) measuring reemitted light by the sensor which has a short response time; and (c) determining a medium reflection value of the entire surface of the measuring mark.

Advantageously, a short response time of the sensors is realized in that the reflected light is measured by photodiodes.

It is advantageous that the control of impulse flanks may be released by a leading edge of a printed measuring mark, and an interrogation of a value measured by the sensors is effected by means of a detecting and holding switching circuit whereas a rear edge of said measuring mark stores a measuring value supply.

The measuring of ink density is effective when the time of measuring ink density is selected so that the mark being monitored at a maximal printing speed, covers, during such selected time, a distance which is insignificant for measuring.

The precision of measuring of ink density is also increased when a measuring surface on the mark is so selected that the medium reflection value from this surface is determined.

It is advantageous to carry out the method of measuring the density so that the control of electrical impulse flanks of signals is released at a leading edge of a printed measuring mark and a control signal is applied to an electrical circuit with the photodiodes and the light source while, during the monitoring of the mark, a changed voltage occurs on the outputs of the photodiodes, which voltage is amplified by an alternating current amplifier and its peak value is stored, and, with a leading edge of the measuring mark available, the photodiodes and the light source are switched off.

According to the method of measuring of ink density of the invention a medium reflection of the entire surface of the mark being monitored can be determined, which substantially increases the precision of such dynamic measuring process.

Due to the utilization of the sensors with short response time periods, for example photodiodes, and owing to the use of a short period of time of measuring, the precision of density measuring is independent from the speed of printing.

Due to a specific processing of a measured value, for example by means of an alternating current amplifier and a storage for storing a peak value of the changed voltage, and also by means of the surface of the photodiode, which is greater than the surface of the mark being monitored, the measurement of ink density can be carried out also at extremely high printing speeds, without however geopardizing the precision of the measurements.

DETAILED DESCRIPTION OF THE PREFERRED EMBODIMENTS

To carry out the method of measuring ink density on printed sheets measuring marks for the release of the control of impulse flanks are positioned with their leading edges, as seen in the direction of transporting of the printed sheets, in front of the marking measuring strip of each printed sheet. The distance between the leading edge of the mark and the front end of the measuring marking strip is selected such that, upon signalling, the photodiode, which is positioned beyond the leading edge of the mark, can set up in the control circuit of the light source a maximal light value, before the leading edge of the mark being monitored is reached by a further photodiode. Simultaneously this further photodiode switches on an alternating current amplifier which amplifies a voltage occuring at the output of that further photodiode and changed by the changed reflected light of the measuring strip marks.

A peak value, also the value, which occurs when the measuring strip marks are located with their entire surfaces below the photodiode, or a number of photodiodes, is stored by means of the detecting and holding switching circuit. The peak value corresponds to a medium reflection value of the light emitted by the light source on the entire surface of the respective mark of the measuring strip. The method provides that the reflection value of the entire surface of the mark being monitored is determined, and that the measured value does not depend, on the transportation speed of the printed sheet.

In order to prevent the operation of the device during the running of the printed region over the scanning region of the photodiodes, which monitor the measuring mark strip, the photodiodes are disconnected from their associated alternating current amplifiers when the rear edge of the mark occurs in the region of the photodiode. Simultaneously with this signal the light source is switched off.

As a substitution for the printed measuring marks an angular transmitter, coupled with the printing machine, can be employed. The light-intake-reduction is scanned through unevenness on the upper surface of the printed sheet by two measuring marks applied at two different scanning angles, which marks reach the photodiodes while the printed sheet is advanced in the transport direction. The precision of measuring is increased because two measured values are combined into a medium value.

For measuring ink density under very high printing speeds and when the response time of the photodiodes (few "b") and the connected therewith non-determined surface of the measuring mark (with 10 m/s few "m"), it is important that the surface of the photodiode, or of a number of photodiodes, be so selected that it is respectively greater than the surface of the measuring mark. The peak value of the amplified voltage thereby corresponds to an actual medium reflection value.

The influxes through the reflection value of the surface lying outside the marks of the measuring strip are prevented by a Schmitt-trigger which is adjusted to a lower threshold value.

It will be understood that each of the elements described above, or tow or more together, may also find a useful application in other types of differing from the types described above.

While the invention has been illustrated and described as embodied in a method for measuring ink density, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a method for measuring ink density on printed sheets in an operating printing machine by means of a measuring head, a light source which illuminates measuring marks provided on a printed material, a sensor, which receives reflected light from said marks and measures a value of the reflected light and converts said value of said light into electric signals, and an electric circuit receiving signals from said sensor, the improvement comprising:

releasing a start of a measuring process by controlling electrical impulse flanks of said signals, wherein measuring of said light reflected from a measuring mark is performed by sensors having short response time; and determining a medium reflection of an entire surface of a measuring mark being scanned, wherein said controlling of electrical impulse franks of said signals is released via a leading edge of at least one printed measuring mark and the light source responds via a control switching circuit whereas a rear edge of said measuring mark effects a brief interrogation of a value measured by the sensors by means of a detecting and holding switching circuit; and wherein the reflected light is measured by photodiodes and said controlling is switched in circuit with the photodiodes and the light source, while, during the monitoring of the mark, a changed voltage occurs on the inputs of the photodiodes, which is amplified by an alternating current amplifier and a peak value of the amplified voltage is stored, and when a leading edge of the measuring mark is available near the photodiodes the latter and the light source are switched off.

2. The method as defined in claim 1, wherein the time of measuring ink density is selected so that the mark being monitored at a maximal printing speed, covers, during such selected time, a distance which is insignificant for measuring.

3. The method as defined in claim 1, wherein a measuring surface of the mark is selected so that a medium reflection of the measuring mark is determined from said surface.

* * * * *